US009867392B2

(12) United States Patent
Bender

(10) Patent No.: US 9,867,392 B2
(45) Date of Patent: Jan. 16, 2018

(54) METHOD OF CREATING MEAT STRIPS

(71) Applicant: Howard M. Bender, Carol Stream, IL (US)

(72) Inventor: Howard M. Bender, Carol Stream, IL (US)

(73) Assignee: Schmaltz Retail Products, LLC, Naperville, IL (US)

( * ) Notice: Subject to any disclaimer, the term of this patent is extended or adjusted under 35 U.S.C. 154(b) by 563 days.

(21) Appl. No.: 13/630,411

(22) Filed: Sep. 28, 2012

(65) Prior Publication Data
US 2014/0093627 A1    Apr. 3, 2014

(51) Int. Cl.
*A23L 13/40* (2016.01)
*A23L 13/00* (2016.01)

(52) U.S. Cl.
CPC ............. *A23L 13/428* (2016.08); *A23L 13/03* (2016.08)

(58) Field of Classification Search
CPC ...... A23L 1/314; A23L 1/31445; A23L 1/318; A23L 1/00; A23L 1/31; A23L 13/428; A23L 13/72; A23B 4/023; A23B 4/044; A23B 4/00; A23B 4/02
USPC .................................. 281/281, 289, 293, 296
See application file for complete search history.

(56) References Cited

U.S. PATENT DOCUMENTS

| | | | |
|---|---|---|---|
| 3,240,612 A * | 3/1966 | Wolnak | 426/266 |
| 3,503,760 A * | 3/1970 | Allen | A23B 4/0526 426/312 |
| 3,890,451 A | 6/1975 | Keszler | |
| 4,132,810 A | 1/1979 | Knutzon | |
| 4,196,222 A | 4/1980 | Cheney | |
| 4,305,965 A | 12/1981 | Cheney | |
| 4,446,159 A | 5/1984 | Roth | |
| 5,290,584 A | 3/1994 | Ray | |
| 5,997,925 A | 12/1999 | Wilson et al. | |
| 8,337,934 B2 * | 12/2012 | Kunert et al. | 426/645 |
| 2004/0247763 A1 | 12/2004 | Shull | |
| 2005/0170066 A1 | 8/2005 | Greathouse | |
| 2005/0175749 A1 | 8/2005 | Gruis | |
| 2006/0088651 A1 * | 4/2006 | Sandoval | A23L 1/31427 426/656 |
| 2008/0181987 A1 * | 7/2008 | Lusby et al. | 426/62 |
| 2010/0015305 A1 | 1/2010 | Grow | |
| 2012/0040062 A1 | 2/2012 | Srsen et al. | |

OTHER PUBLICATIONS

Juttelstad. "Form and Function: Restructured Meats—Part One". Available online as of 1998 (no month) from Foodingredientsonline.com. pp. 1-12.*
"Komet—Vacuum Packaging Techniques With or Without Modified Atmosphere." Available online as of Feb. 26, 2011 from www.vakuumverpacken.de. pp. 1-12.*

(Continued)

Primary Examiner — Jenna A Watts
(74) Attorney, Agent, or Firm — Patula & Associates, P.C.

(57) ABSTRACT

A method of creating a meat piece includes cooking a meat product until it is fully cooked including cooking the meat product until it has an internal temperature of approximately at least 165° F. After cooking the meat product, the meat product is sliced into meat pieces. The method then includes coating the meat pieces with a coating agent with at least cane sugar, salt, liquid smoke, and starch. Then the coated meat pieces are packaged.

19 Claims, 1 Drawing Sheet

(56) References Cited

OTHER PUBLICATIONS

Coila. "What is Cane Sugar?" Available online as of Nov. 12, 2010 from livestrong.com. pp. 1-4.*
"Sodium Erythorbate, Sodium Ascorbate, Ascorbic acid". Malabar.com. Available online as of Apr. 25, 2016. pp. 1-2.*
"Boss Hog Style Bacon Honey BBQ Rubbed". Available online from baconfreak.com as of Nov. 1, 2010. pp. 1-4.*
Barbara Young, Lisa White, Bacon Technoloty 101, Creating bacon from pork bellies is an old story that has evolved into a modern rendition, thanks to the evolution of food science and equipment automation, The National Provisioner, pp. BTJ-1 to BTJ-20, Feb. 2008.
Author unknown, Ohio State Univ., Food, Science and Technology, 605, Lab 1, Water Activity (http://class.fst.ohio-state.edu/fst605/Laboratories/lab%201_water%20Activity.pdf) (2004), pp. 1-7.
Martin E. O'Connor, Institutional Meat Purchase Specifications, Fresh Beef Series 100, Agricultural Marketing Service, Mar. 2010, pp. 37-38.
USDA Food Safety Inspection Service, Administrative Management, Human Resource Development Division, Processing Inspectors' Calculations Handbook, 1995, pp. 80-82.

\* cited by examiner

METHOD OF CREATING MEAT STRIPS

BACKGROUND

Field of the Invention

The subject matter presented herein relates to a method of creating a non-porcine meat strip that looks, tastes, smells, and has a mouthfeel like pork bacon.

Description of the Related Art

Pork bacon is a known flavorsome, desirable food. Due to religious restriction, simply tradition, or normal practice, a large segment of the world's population does not eat pork products. Thus, it is desirable to provide an alternate species bacon that looks, tastes, smells, and feels (mouthfeel) like pork bacon but is made of other types of meat. Many have tried to make such an alternate species bacon with the organoleptics of pork bacon but the taste and texture fall far short of that provided by pork bacon, or the meat strips fall apart as they are handled, especially those made of extrusions from comminuted meats. Also, such alternative bacons should be made to have a relatively long refrigerated shelf life so that food stores can keep the bacon on its shelves and restaurants can keep selling the bacon without significant waste. Thus, a non-porcine, alternate species bacon is desired that substantially has the organoleptics of pork bacon but has a relatively long refrigerated shelf life.

BRIEF DESCRIPTION OF THE DRAWINGS

FIG. 1 is a drawing of finished bacon-like meat pieces according to the present invention.

SUMMARY

The deficiencies mentioned above are solved by a method of creating a meat piece that comprises cooking a meat product until the meat product is fully cooked by cooking the meat product until the meat product has an internal temperature of approximately at least 165° F. After cooking the meat product, the method includes cutting the meat product into meat pieces, and coating the meat pieces with a coating agent with at least sugar such as cane sugar, salt, liquid smoke, and starch. Then the process may conclude with packaging the meat pieces.

In another form, a method of creating a non-porcine bacon-like meat strip comprises cooking a meat product until the meat product is fully cooked, and then chilling the meat product after the cooking of the meat product. After chilling the meat product, the process includes cutting the meat product into meat pieces, and coating the meat pieces with a coating agent comprising sugar such as cane sugar at least about 80% by weight, salt, liquid smoke, and starch. The coated meat pieces are then packaged.

In yet another form, a method of creating a non-porcine bacon-like meat strip comprises fully cooking the meat product to at least 165° F., chilling the meat product after fully cooking the meat product, and vacuum packaging the meat product after chilling the meat product. The process then proceeds with unpackaging the meat product, cutting the meat product into meat pieces after unpackaging the meat product, and coating the meat pieces with a coating agent that comprises at least sugar such as cane sugar. The meat pieces are then finally packaged sometime after coating the meat pieces.

DETAILED DESCRIPTION OF THE INVENTION

Applicant discovered a two-phase method of creating a non-porcine bacon or bacon-like meat strip that has the organoleptics of pork bacon as shown in FIG. 1. In one form, the first phase includes steps for fully cooking a meat cut or meat product (or herein simply referred to as the product). In a second phase, the product is sliced into pieces, such as bacon-size meat strips, and then coated with a sweetener and crisping coating agent before it is finally packaged for sellers, restaurants, or consumers. Herein, sellers refer to any entity such as retailers, wholesalers, grocery stores, and so forth that primarily sell the final meat strips in a package whether or not to the end consumer, while restaurants, including delis for example, refer to those entities that receive the meat strips in its final package but then primarily remove the packaging to sell or serve the meat strips to end consumers.

Fully cooking the product in the first phase results in meat strips that are edible out of the package and avoid food safety issues related to the sale of raw or non-fully cooked meats. The fully cooked meat also reduces waste by permitting relatively longer sell by or use by dates thereby permitting longer shelf lives, and in one form, up to about 60 days from the date of final packaging while in refrigeration. Fully cooking the product also creates a more consistent meat texture for organoleptic acceptance as well as mechanical sliceability and performance. The product may also be smoked during the cooking steps as explained below to further provide bacon-like flavoring.

The coating agent in the second phase, in one form, may include sugar, salt, liquid smoke, and starch. In one form, the coating agent is mostly cane sugar, and in another form may be at least about 80%, 85%, 90%, or 95% cane sugar by weight of the coating agent. In another form, the coating agent may have about 95-96% cane sugar. In other alternatives, other types of sugar may be used. The coating agent is described in greater detail below.

Each phase of the two-phase process may include one or more steps to further enhance the flavor and other organoleptics of the resulting meat strips and to form the meat strips more indistinguishable from pork bacon. By one approach, the two-phase process may include the following basic steps:

Phase 1 may include at least the following.
A. Cutting the meat product,
B. Brining the meat product,
C. Rubbing the meat product,
D. Cooking and smoking the meat product,
E. Chilling the meat product, and
F. Vacuum packaging the meat product.

Phase 2 of the process may include at least the following.
A. Unpackaging and slicing the meat product into meat pieces,
B. Coating the meat pieces,
C. Adhering the coating agent to the meat pieces,
D. Final packaging of the meat pieces.

By one approach, the method includes all of the steps mentioned above and in the order presented. It will be understood, however, that the process need not always include all of these steps, but may include some smaller combination of these steps, and may not always be limited to the order of the steps as presented above when it appears advantageous to change the order of the steps.

A detailed explanation of the steps that may be included follows below.

I. Phase 1

A. Cutting the Meat Product

In one form, the product is a navel beef cut and (using USDA Institutional Meat Purchase Specifications (IMPS)), may be: (1) 122A plate, full, boneless beef 21-27 lb., 27-29 lb., 29-32 lb., and 32 lb. and up weight classifications; (2) beef plate, short plate, short ribs removed, boneless 10-12 lb., 12-14 lb., 14-16 lb., and 16 lb. and up weight classifications; (3) extended plate; (4) extended plate with navel; or (5) 121G beef plate, short plate, short ribs removed, boneless. Otherwise, in one form, the cut may be any beef belly cut whether full plate, plate/navel, short plate, or square cut plate.

The beef belly cuts provide similar attributes to pork bacon even though it typically has tougher membranes, connective tissue, and non-muscle components versus that of pork cuts from comparable areas. This provides the resulting meat strips with a structure, such as its tendon direction, sinew, gristle, and so forth, that enables the resulting meat strips to have excellent bacon-like texture and mouthfeel, and with a body that does not fall apart when handled. Otherwise, the process below is able to overcome differences in taste and flavor that might be caused by the differences in structure compared to pork bacon.

By an alternative form, the cut may be any beef cut whether or not on or near the belly. By one approach, the meat product may be an all natural beef bacon from, or may include, the cap muscle (Gracilis) on the top round that is otherwise used for ground round. This may provide more cuts in addition to the belly available for the meat product, qualifies the finished meat pieces to be labeled "Round Steak" or "Top Round Steak", and may require less trimming than with plate/navel cuts.

After the product is cut, it is then trimmed to remove unwanted bone, and so forth.

B. Brining the Meat Product

Once cut and trimmed, the product may then be injected with a brine or seasoned curing solution by a Famaco or other similar injector. The products are injected with a curing solution up to 40% (by weight per USDA pumping requirements) with a 10% drain back. In other words, generally, when injecting to 40%, 10% of that injection solution will purge back out of the muscle or the product that the cure solution was injected into. The product then may be placed to sit or rest for about 30 minutes before permitting the drain back.

By one example, the components of the curing solution may be as follows: water (about 20-22%), sodium lactate (about 1-3%), salt (about 1-3%), sugar (about 1-3%), spice extractives (0-0.5%), cure salt made of about 6.25% sodium nitrite (about 0.1-0.5%), sodium erythorbate (about 0.01-0.10%), and sodium bicarbonate (0.1-1.0%) where the percentages are of the total weight of the solution plus the meat product. Alternatively, the curing solution may be one of these three example mixtures shown on Table 1:

TABLE 1

Curing Solution Mixtures

| Mixture 1: Regular | Mixture 2: Clean | Mixture 3: Natural |
|---|---|---|
| water | water | Water |
| sodium lactate | | |
| salt | salt | sea salt |
| sugar | sugar | natural sugar |
| flavorings | flavorings | |
| spice extractives | spice extractive | Spices |
| sodium diacetate, | | |
| baking soda | baking soda | baking soda |
| sodium erythorbate, and | sodium erythorbate | celery powder |
| sodium nitrite. | sodium nitrite | |

Other curing solutions are contemplated however.

Then, the product may be kept submerged in the curing solution for at least about 24 hours in one example. Once removed from the curing solution, the product may be placed to rest for about 5 to about 15 minutes, which may result in additional curing solution loss. While the curing solution used for injection and that used for submersion are mainly the same brine mixture, in other cases, the brine mixtures can be different. Alternatively, the product may be soaked in curing solution for several weeks instead of using injected curing solution.

C. Rubbing the Meat Product

The meat product also may be rubbed with a seasoned rub. Rubs can be applied by hand and/or by machine such as a tumbler or vacuum tumbler. A given percent of rub material is calculated and added to the tumbler with a given % amount of the brined product. The tumbler provides a more uniform and consistent application of the rub as compared to a hand rub. The tumbler may also assist with acceleration of uniform dispersion of the curing solution within the product.

In one example, the rub may be a mixture of spices, caramel, and dextrose. The spices may include Coriander for about 60-80% of the rub, Black Pepper for about 10-20% of the rub, Allspice for about 1-5% of the rub, Coriander oil for about 0.25-0.50% of the rub, and may include other spices such as garlic powder, granular garlic, cloves or clove oils and extracts, and/or cinnamon. A specific example of a rub composition is provided in the Example below on Table 5. In another form, the dextrose may be omitted, the caramel may be omitted, or both may be omitted.

D. Cooking and Smoking the Meat Product

The meat products are then placed on smokehouse racks for cooking in a humidity and temperature controlled smokehouse or oven. In addition to dry bulb temperature control, the smokehouse may have a wet bulb temperature control to adjust the relative humidity in the cooking/smoking chamber. One or more meat products are placed in a smokehouse at the same time and the flat racks have openings for smoke and heat penetration. A smoke generator introduces smoke from mixed hardwood shavings, such as hickory and so forth, during a smoke cycle of the cooking process. During the smoke cycle of the cooking stages, smoke is introduced into the air system of the smokehouse through pipes coming from a smoke generation chamber. The smoke then flows into a cooking/smoking chamber and out of the cooking/smoking chamber through dampers to exhaust vents. The dampers may be open or closed to vent or trap the smoke in the cooking/smoking chamber as desired. The smoking assists with flavor development, color development, and product preservation or surface control of spoilage bacteria.

By one approach, as shown on Table 2 below, an example cooking and smoking process is divided into two smoking cycles before three heating stages over nine steps or periods. Each smoking cycle may include an initial period for heating the meat product without any smoke. This may be about 30 minutes at about 150° F. (dry bulb unless stated otherwise) for a first smoking cycle, or about 60 minutes at about 160° F. for a second smoking cycle as shown in the current example. This serves to dry the exterior surface of the meat product for better bonding and penetration by the smoke. In the next period, the smoke is turned on and the dampers are closed to retain the smoke in the cooking/smoking chamber and around the meat product for about 15 minutes. Thereafter, the smoke is turned off while the dampers remain closed for a smoke dwell time of about 5 minutes. The smoke is released during the beginning of the next smoke cycle or heat stage. No smoke is provided in the heating stages after the smoke cycles, but the humidity may be increased to reduce drying out of the smoked meat product.

TABLE 2

Example Cooking and Smoking Schedule

| Step | Time (Min.) | Dry Bulb | Wet Bulb | Rel. Humidity | Dampers | Smoke |
|---|---|---|---|---|---|---|
| 1 | 60 | 150 | Off | ambient | Auto | Off |
| 2 | 15 | — | — | ambient | Closed | On |
| 3 | 5 | — | — | ambient | Closed | Dwell |
| 4 | 30 | 160 | Off | ambient | Auto | Off |
| 5 | 15 | — | — | ambient | Closed | On |
| 6 | 5 | — | — | ambient | Closed | Dwell |
| 7 | 30 | 160 | Off | ambient | Auto | Off |
| 8 | 60 | 160 | 135 | 49% | Auto | Off |
| 9 | Until 165° F. plus four minute dwell | 185 | 170 | 70% | Auto | Off |

For the example provided above, the subsequent heating stages are about 30 minutes with the smokehouse set at about 160° F., then about 60 minutes at 160° F. but with 49% relative humidity. Finally, the smokehouse is set at about 185° F. until the meat product has an internal temperature of at least about 165° F. This internal temperature is held at a four minute dwell (where at least that temperature of the product is maintained for four minutes). The 165° F. target internal temperature should be reached at the center or coldest part of the largest meat product in the smokehouse as measured by probe or thermocouple placed at the thickest part of the meat product. The cooking time of the last heat stage period may depend on fan or blower speed and other factors of the smokehouse. This will fully cook the meat product.

It will be appreciated that the cooking and smoking process need not always be limited to the nine step process presented above, and may include more or less smoking cycles and more or less non-smoking heat stages. These also may not necessarily be in the same order presented on table 2. Thus, it is possible to place all or more heating stages before or in between smoke stages. For other alternatives, the first smoking cycle may include a first period of non-smoke of about 50-65 minutes, a second smoke period of about 10-20 minutes and a smoke-dwell period of about 0-10 minutes. The second smoking cycle may be similar except with a first non-smoking period of about 25-35 minutes.

The heating stages also may be adequate with a first stage at about 25-35 minutes, and a second stage of about 55-65 minutes at 48-50% relative humidity, and finally, the last stage may alternatively be performed at 69-71% relative humidity.

By another alternative approach, the cooking and smoking may be performed in two main stages. In a first cooking stage, the smokehouse temperature is about 120° F. for about 30 minutes with about 50% relative humidity, while in a second cooking stage, the smokehouse temperature is about 190° F. with about 72% relative humidity until the internal temperature of the meat product is 165° F. The smoke may be introduced in one or more smoke cycles (no smoke, smoke, dwell) during the first cooking stage, the second cooking stage, or both.

It will be appreciated that many other different examples are contemplated.

E. Chilling the Meat Product

After cooking, the product is moved to a chilling cooler and chilled. Chilling is performed within a set time after cooking and in accordance with USDA minimum guidelines of product temperature reduction to prevent microbiological growth and product spoilage. Chilling also allows the denatured protein structure to "reset" to a firm state which allows handling and vacuum packaging. In one example, the meat product is chilled in a cooler with high velocity air flow at no more than about 34° F. for about 14 hours to reach a product temperature of about 38° F. This meets or exceeds USDA requirements for chilling.

F. Vacuum Packaging the Meat Product

After chilling, the product is packaged in vacuum sealed (or simply referred to as vacuum) shrink bags, labeled, and weighed when the product is to be shipped to a separate manufacturer for slicing and/or applying the final coating agent to the sliced meat pieces for phase 2 of the process. However, this step may still be used even though the same manufacturing plant performs both process phases, but when the meat product is not to be finally packaged for a relatively long time period. The immediate vacuum packaging mitigates potential large losses in moisture due to air movement in coolers that would occur on un-packaged muscles or cooked cuts of product. Loss of moisture due to surface evaporation will significantly impact yield as well as product dryness (and hence the quality). Thus, immediate vacuum packaging after chilling is very advantageous.

The vacuum packaging may be a polymer based packaging that provides an air and moisture-tight seal. In one form, the packaging may be made of vacuum or shrink bag film such as Sealed Air® Cryovac® B-4770 shrink bags, ClearTite® shrink bags, or similar bags.

Otherwise, the vacuum packaging could be omitted if phase 2 processing on the product could begin relatively quickly after the chilling step in the same plant for example. In this case, the process would proceed directly to phase 2 where the product is sliced, coated, cooled, and then finally packaged for shipment to sellers, restaurants, and consumers.

II. Phase 2

A. Unpackaging and Slicing the Meat Product into Meat Pieces

The meat product is removed from the vacuum bags, and in some cases slightly squared off. The meat product is then sliced, in one form, into multiple meat pieces such as slices or strips each approximately typical bacon sizes. The slices may be about 3/32 inch thick in one form, and may be about 3/32 to about 1/2 inch thick in another form. In yet another form, the slices may be about 1/8 to 1/2 inch thick. It will be understood, however, that the final meat pieces may not be bacon sized slices or strips, and may have other dimensions that are more square rather than elongated, may be more block shaped than strip shaped, or may have other unusual dimensions. Also, a bacon press, such as the Anco® 1411P-G3 Bacon Press for example, may be used to improve yields and slice uniformity.

B. Coating the Meat Pieces

After the meat product is sliced, the meat pieces are coated with a coating agent composed of a mixture of primarily cane sugar (which may be pure cane sugar), salt, liquid smoke, and corn starch. In one form, the coating is mostly cane sugar (more than 50%), and in another form may be at least about 80%, 85%, 90%, or 95% cane sugar by weight of the coating agent and cane sugar or another sugar. In another form, the coating agent may have about 95-96% cane sugar. In this case, the remaining 4-5% by weight of the coating agent may include the remaining ingredients such as various sugars (brown, cinnamon, or beet-based sugar for example), starches such as corn starch or other starches, salt, and flavors including smoke flavors whether natural, artificial, or both, including Red Arrow® smoke flavors, and/or Zesty Smoke® flavors (from Kerry Group).

The high content of the cane sugar is desired so as to require as little coating as possible to obtain the proper flavor and texture results. Lesser amounts of sugar require more coating on each meat piece and will make the pieces harder to handle and machine. It also creates more undesirable residuals on thermal reconstitution devices, such as skillets, griddles and pans.

The amount of coating agent desired for each meat slice may depend on the total sugar content of the starting cooked beef material so that the injection sugar level and the level of sugar in the brine will contribute to the sweetness. In one form, when the injected cooked beef has about 1.5-2.0% sweetener level, each meat slice may be provided with another about 9.5 to 10.5%, and in form about 10%, sugar, and of the starting sliced weight. For example, an about 20 gram slice of injected and brined beef strip will have about 2 grams of sugar added from the coating agent. In one form, this is applied in the form of the coating agent as about 1 gram of sugar on the surface of each of the two main sides of the meat slice or strip. By one approach, applying a coating agent with about 95-96% of cane sugar by weight or similar composition, the coating agent per meat slice may be provided about 10% to about 11% by starting slice weight of the meat slice, and in another form about 10.4% to about 10.5% by starting sliced weight of each meat slice. Thus, by one approach, the coating agent should be applied to be no greater than about 11%, 10.4%, 10.5% or 10% by starting slice weight of the meat slice or piece.

The amount of sugar for each slice may be further decreased when the starting beef "base material" has been pumped with a higher % sugar brine, thus establishing a balance between sugar from the coating and injected/brine sugar. By one approach, the overall sweetness level or sugar content is about 10% to about 14%, and in one form, about 12% of the starting sliced weight. These measurements were made using dry solids so that a liquid form may need higher amounts. These amounts were also determined using sweeteners such as plain sucrose and cane sugar, desirable at a sweetness level that may be different than that required by different types of sugar.

In other alternatives, cane, beet or any non-reducing sugar is used so as not to brown or darken significantly during the thermalization of the meat slices. As mentioned above, reducing sugars are not as desirable for this process.

The coating agent may be a liquid or a dry mix in which all dry ingredients are blended until uniform. If liquid, the coating agent may be sprayed on at least two main sides of each meat slice shaped as a strip, but otherwise generally on all sides of the meat slice, for uniform coverage. Otherwise, the meat slices may be dredged, batter dipped, or run under a water fall of coating agent solution for uniform coverage. This coating agent or glaze creates crispness, some caramelized and fried coloration, and develops sweet umami flavor enhancement. In one form, the combination of the coating agent with the other features herein, such as applying the coating agent after the meat product is fully cooked for example, provide non-porcine meat slices that look, smell, taste, and provide mouthfeel like pork bacon to such a close degree that it has not been attained by others before.

C. Adhering the Coating Agent to the Meat Pieces

Additional steps may be provided to aid in adhesion of the coating agent to the meat pieces. In one form, the meat pieces or slices may be placed in a cooler for up to 24 hours after the coating step. This allows the coating agent treatment to further adhere, and somewhat penetrate, the meat product surface for better flavor retention. This step may be eliminated if a manufacturer has an in-line processing procedure such as with an in-line air knife that will blow off excess solution or mixture as well as help the coating agent further adhere to the meat product surface.

Alternatively, or additionally, the meat slices may be placed for rest for about one day on open parchment paper after the coating step and before the slices are vacuum seal packaged for shipment to sellers, restaurants, or consumers.

D. Final Packaging of the Meat Slices

After coating and any other alternative step facilitating the adhesion of the coating agent on the meat slices, the meat slices are finally packaged for shipment. The meat slices may be placed in polymer, vacuum seal packaging such as Curlon® film structures or equivalents, and so forth. The meat pieces may be packaged using Curwood Flex Vac® continuous-motion packaging machines or Sealed Air Cryo-Vac® machines for example. The meat slices may be oriented in the package in shingle style. The packaged meat slices may have a sell by or use by date set at approximately 60 days from the final packaging date and depending on the type of final packaging.

III. Consumer Cooking/Heating of the Product Before Consumption

While the meat pieces or strips may be eaten directly out of the package since it has been fully cooked, it is recommended that the consumer reheat the meat strips for best taste and crisp texture. Once removed from its final package, the meat strips may be laid out on parchment paper on a pan, baked in a convection oven at 350 degrees for 8 minutes, laid as a single layer on a cooling rack, and then served. Otherwise, the meat strips may be fried, baked in other types of ovens, or microwaved, or prepared or used in any other way as with pork bacon.

Example

One example recipe for the method of creating a non-porcine bacon-like meat strip is provided below, and tracks the potential weight of the meat strips throughout the process. Weight is tracked in order to comply with USDA regulations regarding the percentage of additives (like curing solution, rub, and coating) that can be added to compensate for the loss of moisture during cooking and that form the total weight of the final product. In the example recipe, the raw material or meat product may be a beef Pastrami Eye cut from Navel, weighing 2500 grams.

The meat product may be injected with a brine or curing solution as described above. The ingredients for the curing solution for both injection and submersion listed on Table 3 below.

TABLE 3

Curing Solution Composition

| Ingredient Name | Weight (lbs) | Percent (by Weight) | Batch Weight (per Ingredient) (grams) |
|---|---|---|---|
| Beef Navels | 71.42 | 71.42 | 2500.00 |
| Water | 21.88 | 21.88 | 765.89 |
| Salt | 2.00 | 2.00 | 70.01 |
| Sodium Lactate/acetate | 2.00 | 2.00 | 70.01 |
| Sugar | 1.60 | 1.60 | 56.01 |
| Spice Extractives | 0.34 | 0.34 | 12.08 |

TABLE 3-continued

Curing Solution Composition

| Ingredient Name | Weight (lbs) | Percent (by Weight) | Batch Weight (per Ingredient) (grams) |
|---|---|---|---|
| Cure Salt (6.25% sodium nitrite) | 0.20 | 0.20 | 7.00 |
| Sodium Bicarbonate | 0.50 | 0.50 | 17.50 |
| Sodium Erythorbate | 0.05 | 0.05 | 1.92 |
| Total | 100.00 | 100.00 | 3500.42 |

After injection, the product is laid to rest for 30 minutes before drain back, which measures 350 grams brine loss (10%) for this example. After subsequently submerging the product for 24 hours, the product may be removed from the brine and may be placed to rest for about 5 to 15 minutes. This may result in about 20 grams additional brine loss for a total weight of the meat product after draining at about 3130 grams.

A pre-blended rub is then rubbed on a surface of the product by the methods mentioned above, resulting in the following weights:

TABLE 4

Weights after Injection and Rub

| Ingredient Name | Weight (lbs) | Percent (by Weight) | Batch Weight (per Ingredient) (grams) |
|---|---|---|---|
| Injected meat cut | 98.00 | 98.00 | 3130.00 |
| Rub | 2.00 | 2.00 | 63.88 |
| Total | 100.00 | 100.00 | 3193.88 |

The composition of the rub in the example is as follows:

TABLE 5

Rub Composition

| Ingredient Name | Weight (lbs) | Percent (by Weight) | Batch Weight (per Ingredient) (grams) |
|---|---|---|---|
| Coriander | 66.60 | 66.60 | 42.54 |
| Black Pepper | 17.30 | 17.30 | 11.05 |
| Caramel Color | 8.00 | 8.00 | 5.11 |
| Dextrose | 5.00 | 5.00 | 3.19 |
| Allspice | 2.42 | 2.42 | 1.55 |
| Spice Extract | 0.50 | 0.50 | 0.32 |
| Coriander Oil | 0.1800 | 0.1800 | 0.1150 |
| Total | 100.00 | 100.00 | 63.87 |

The meat product is then cooked by the cooking and smoking schedule detailed above on Table 2. The meat product is cooked until an internal temperature of the thickest part of the largest piece (if more than one is in the smokehouse at the same time) reaches a minimum of about 165° F. or exactly 165° F. by our example. The meat product weight before the smokehouse, in this example, is 3193.88 grams, while the cooked product weight is about 2395 grams.

The meat product is then taken out of the smokehouse and chilled in a cooler with high velocity air flow at no more that 34° F. The meat product is chilled for 14 hours at 34° F. to reach a temperature of 38° F. The cooked and chilled product weight is about 2275.25 grams (pre-packaging).

The meat product is then packaged in a vacuum shrink bag, labeled and weighed.

Phase 2

The meat product may be removed from its vacuum bag and squared for accurate slicing. The meat product then may be sliced into meat pieces, strips, or slices about 3/32-1/2" thick. A slicing weight is approximately 10% or 227.5 grams for each slice in the current example for about 2,048 grams total for all slices from the meat product added together.

Each meat strip is enhanced with a coating agent that includes dry cane sugar 95-96% by weight of the coating agent, and 4-5% of the coating agent may include other various sugars (such as non-pure cane sugar, beet-based sugar, brown, or cinnamon sugar for example), starches, salt, and flavors including smoke flavors whether natural, artificial, or both including Zesty Smoke® (Kerry Group), or Red Arrow® smoke flavors. The total weight with the enhancement (coating agent) is about 2,150.4 grams for this example and including all slices forming the meat product. As mentioned above, this can be either a dry coating or liquid spray or dip application. For this example then, a coating agent of about 10.2 grams were applied to each slice for about 4.5 to 5.0% coating agent by sliced weight.

Additional drying or quick freezing steps may aid in adhesion of the coating agent to the meat slices. In the current example, the meat slices are placed for rest for about one day on open parchment paper before the slices are vacuum seal packaged for shipment to sellers, restaurants, or consumers. The vacuum packaged shingled product can last for up to 60 days (refrigerated) as described above.

It will be appreciated that while the meat product is formed of beef belly, the process may be applied to other types of beef and meat sources such as poultry or turkey. Moreover, the processes described herein alternatively can be applied to pork bacon and other porcine products. Also, non-porcine meat product herein refers to a main meat body or cut forming the meat product that is not porcine. Any curing solution, rub, coating agent, or any other additive may include bacon or porcine products.

While the invention herein disclosed has been described by means of specific embodiments, examples and applications thereof, numerous modifications and variations could be made thereto by those skilled in the art without departing from the scope of the invention set forth in the claims.

What is claimed is:

1. A method of creating a non-porcine bacon-like meat piece comprising:
    brining a beef cut meat product with a brine; rubbing a beef cut meat product with a rub; cooking a beef cut meat product until the meat product is fully cooked comprising cooking the meat product on flat racks;
    after cooking the meat product, pressing the meat in a press and then cutting the meat product into meat pieces;
    after cutting the meat product, coating the meat pieces with a coating agent comprising at least cane sugar, salt, liquid smoke, and starch, wherein the coating agent comprises about 95-96% cane sugar by weight; and
    packaging the meat pieces.

2. The method of claim 1 further comprising the step of chilling the meat product to approximately 38° F. after cooking the meat product and before coating the meat pieces.

3. The method of claim 1 further comprising the steps of vacuum packaging the meat product after cooking the meat product; and unpackaging the meat product before cutting the meat product into meat pieces.

4. The method of claim 1 wherein the step of cooking the meat product includes the step of smoking the meat product in two smoke cycles.

5. The method of claim 1, wherein the brine in the meat product before cooking the meat product, wherein the brine curing solution comprises about 1.0-3.0% sugar content by weight, and wherein the overall sugar content of the meat pieces after coating is about 10-14% of a starting weight of the meat pieces.

6. The method of claim 1 wherein the step of packaging the meat pieces comprises the steps of configuring the meat pieces in shingle style orientation and finally packaging the meat pieces, following the step of coating.

7. The method of claim 1, and wherein each meat piece is provided with an amount of the coating agent of approximately 10.0-11.0% by starting weight of the meat piece.

8. A method of creating a non-porcine bacon-like meat strip comprising:
   in a first phase, brining a beef cut meat product with a brine; rubbing a beef cut meat product with a rub; cooking a beef cut meat product on flat racks until the meat product is fully cooked;
   chilling the meat product after the cooking of the meat product;
   in a second phase, after chilling the meat product, pressing the meat in a press and then cutting the meat product into meat pieces;
   after cutting the meat product, coating the meat pieces with a coating agent comprising cane sugar, salt, smoke flavors, and starch, wherein the coating agent comprises about 95-96% by weight pure cane sugar; and
   packaging the meat pieces.

9. The method of claim 8 wherein the coating agent further comprises at least one of non-pure cane sugar, beet-based sugar, brown sugar or cinnamon sugar in addition to pure cane sugar.

10. The method of claim 8 wherein the smoke flavors comprise at least one of natural smoke flavors and artificial smoke flavors.

11. The method of claim 8, wherein each meat piece is provided with an amount of the coating agent of approximately 10.0-11.0% by starting weight of the meat piece.

12. The method of claim 8 further comprising the steps of vacuum sealing the meat product and unpackaging the meat product after cooking the meat product and before cutting the meat product.

13. The method of claim 8 wherein the step of coating the meat pieces comprises applying an amount of the coating agent such that the overall sugar level is about 12% of a starting weight of the meat piece.

14. A method of creating a non-porcine bacon-like meat strip comprising:
   cutting a beef cut meat product;
   brining the meat product with a brine;
   rubbing the meat product with a rub;
   fully cooking a and smoking the meat product on flat racks;
   chilling the meat product after fully cooking the meat product to about 38° F.;
   vacuum packaging the meat product immediately after chilling the meat product;
   unpackaging the meat product before cutting;
   pressing the meat product in a press;
   cutting the meat product into meat pieces after unpackaging the meat product;
   coating the meat pieces with a coating agent comprising by weight at least 95-96% cane sugar, and 4-5% ingredients including sugars, starches, salt and smoke flavors;
   adhering the coating agent to the meat pieces; and
   packaging the meat pieces approximately 24 hours after coating the meat pieces.

15. The method of claim 14, wherein the rub comprises by weight at least 60-80% coriander, 10-20% black pepper, 8% caramel color, 5% dextrose, and 1-5% allspice.

16. The method of claim 14, wherein the brine comprises at least 20-22% water, 1-3% sodium lactate, 1-3% salt, 1-3 sugar, 0-0.5% spices and 0.1-1% baking soda.

17. The method of claim 14 wherein the step of fully cooking and smoking the meat product comprises smoking the meat product during two smoking cycles including a first smoking cycle of at least 15 minute and a second smoking cycle of at least 15 minutes, before three heating stages including a first heating stage of approximately 30 minutes at about 160 degrees, a second heating stage of approximately 60 minutes at about 160 degrees ° F. at about 49% humidity, and a third heating stage at about 185 degrees ° F. at about 70% humidity.

18. The method of claim 8, wherein the beef cut meat product is a beef belly cut.

19. The method of claim 14, wherein the beef cut meat product is a beef belly cut.

* * * * *